United States Patent
Edgar et al.

(10) Patent No.: US 11,843,634 B2
(45) Date of Patent: *Dec. 12, 2023

(54) HIGH-FIDELITY MODEL-DRIVEN DECEPTION PLATFORM FOR CYBER-PHYSICAL SYSTEMS

(71) Applicant: BATTELLE MEMORIAL INSTITUTE, Richland, WA (US)

(72) Inventors: Thomas W. Edgar, Richland, WA (US); Draguna L Vrabie, West Richland, WA (US); William J. Hofer, Richland, WA (US); Kathleen E. Nowak, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,873

(22) Filed: Mar. 2, 2022

(65) Prior Publication Data

US 2022/0191246 A1 Jun. 16, 2022

Related U.S. Application Data

(63) Continuation of application No. 16/389,758, filed on Apr. 19, 2019, now Pat. No. 11,297,103.

(Continued)

(51) Int. Cl.
*H04L 29/06* (2006.01)
*H04L 9/40* (2022.01)
(Continued)

(52) U.S. Cl.
CPC ......... *H04L 63/1491* (2013.01); *G06N 3/044* (2023.01); *G06N 3/08* (2013.01); *H04L 63/1416* (2013.01)

(58) Field of Classification Search
CPC ............ H04L 63/1416; H04L 63/1491; G06N 3/0445; G06N 3/08
See application file for complete search history.

(56) References Cited

U.S. PATENT DOCUMENTS

| 8,489,632 | B1 | 7/2013 | Breckenridge et al. |
| 11,297,103 | B2 | 4/2022 | Edgar et al. |

(Continued)

OTHER PUBLICATIONS

"A Data Communication Protocol for Building Automation and Control Networks", Jun. 2018, 48 pages.

(Continued)

*Primary Examiner* — Jeffrey C Pwu
*Assistant Examiner* — Thong P Truong
(74) *Attorney, Agent, or Firm* — Colby Nipper PLLC

(57) ABSTRACT

Methods are described for protecting a cyber-physical system against a potential attacker of the system. The methods include a method of generating a plurality of examples for a training data set and training a system model using the training data set to generate a decoy configured to generate a synthetic output that mimics historical outputs generated by the system for a given historical system context. Also described is a method including receiving a system context of a cyber-physical system; receiving an inquiry into the system by a potential attacker; applying a system model to the system context and the inquiry; obtaining from the system model a synthetic output that mimics how a component of the system would respond to the inquiry given the system context; and providing the synthetic output to the potential attacker.

21 Claims, 4 Drawing Sheets

Related U.S. Application Data

(60) Provisional application No. 62/664,702, filed on Apr. 30, 2018.

(51) Int. Cl.
*G06N 3/08* (2023.01)
*G06N 3/044* (2023.01)

(56) References Cited

U.S. PATENT DOCUMENTS

| | | |
|---|---|---|
| 2012/0010757 A1 | 1/2012 | Francino et al. |
| 2014/0163761 A1 | 6/2014 | Kuhns et al. |
| 2014/0189860 A1* | 7/2014 | Hull Roskos ......... G06F 21/552 726/22 |
| 2016/0218506 A1 | 7/2016 | Bamberger et al. |
| 2017/0177016 A1 | 6/2017 | Chiang et al. |
| 2018/0226799 A1 | 8/2018 | Baker et al. |
| 2018/0321650 A1 | 11/2018 | Feng et al. |
| 2018/0358812 A1 | 12/2018 | Anderson et al. |
| 2019/0081980 A1* | 3/2019 | Luo ........................ G06N 20/00 |
| 2019/0148977 A1 | 5/2019 | Kuroda et al. |
| 2019/0372350 A1 | 12/2019 | Joko |
| 2020/0076850 A1 | 3/2020 | Edgar et al. |
| 2020/0373759 A1 | 11/2020 | Samaan et al. |

OTHER PUBLICATIONS

"IEEE Standard for Electric Power Systems Communications—Distributed Network Protocol (DNP3)", IEEE Std 1815™—2012 (Revision of IEEE Std 1815-2010), Oct. 2012, 1461 pages.
"Non-Final Office Action", U.S. Appl. No. 16/389,758, dated Aug. 31, 2021, 12 pages.
"Non-Final Office Action", U.S. Appl. No. 16/534,972, dated Oct. 21, 2021, 27 pages.
"Notice of Allowance", U.S. Appl. No. 16/389,758, dated Dec. 17, 2021, 13 pages.
"Standard TOP-002-2—Normal Operations Planning", Nov. 1, 2006, 6 pages.
Almeshekah, et al., "Planning and Integrating Deception into Computer Security Defenses?", Sep. 2014, 11 pages.
Antonioli, et al., "MiniCPS: A toolkit for security research on CPS Networks", Jul. 17, 2015, 8 pages.
Falliere, et al., "W32.Stuxnet Dossier", Nov. 2020, 64 pages.
Ke, et al., "A Three-Stage Enhanced Reactive Power and Voltage Optimization Method for High Penetration of Solar", Electrical Infrastructure Group; Pacific Northwest National Laboratory; in the Proc. of IEEE/PES General Meeting, Chicago, Jul. 2017, 5 pages.
Ke, et al., "Coordinative Real-time Sub-Transmission Volt-Var Control for Reactive Power Regulation between Transmission and Distribution Systems", IET Generation Transmission & Distribution; ResearchGate, May 2019, 10 pages.
Lantz, et al., "A Network in a Laptop: Rapid Prototyping for Software-Defined Networks", Jan. 2010, 6 pages.
Li, et al., "Hijacking an Insulin Pump: Security Attacks and Defenses for a Diabetes Therapy System", Jun. 2011, pp. 150-156.
McEntee, et al., "A VSM-Based DER Dispatch MINLP for Volt-VAR Control in Unbalanced Power Distribution Systems", Conference Paper; ResearchGate, Aug. 2019, 6 pages.
Zhang, et al., "Honeypot: a Supplemented Active Defense System for Network Security", Aug. 2003, pp. 231-235.
Zhu, et al., "A Hierarchical VLSM-Based Deman Response Strategy for Coordinative Voltage Control between Transmission and Distribution Sytems", Article in IEEE Transactions on Smart Grid; ResearchGate, Sep. 2018, 11 pages.
Zhuang, et al., "Reasons for Secrecy and Deception in Homeland-Security Resource Allocation", Dec. 2010, pp. 1737-1743.
"Foreign Office Action", CA Application No. 3,041,865, dated Aug. 23, 2023, 4 pages.

* cited by examiner

HIGH-FIDELITY MODEL-DRIVEN DECEPTION PLATFORM FOR CYBER-PHYSICAL SYSTEMS

PRIORITY/CROSS-REFERENCE TO RELATED APPLICATIONS

This application is a continuation of application Ser. No. 16/389,758, filed Apr. 19, 2019, which claimed the benefit of U.S. Provisional Application No. 62/664,702, filed Apr. 30, 2018, the disclosures of which are herein incorporated by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

In the field of cyber security, deception defense is a technique sometimes used to slow down an attacker. Deception defense involves enticing an attacker away from an actual target, to give security administrators time to respond. In traditional computing systems (e.g., Information Technology (IT) systems, banking systems, mobile computing systems, and other non-control systems), an attacker may be deceived by mock protocol communications and data in the system. For instance, some deception systems work by responding to an attacker's protocol communications with pre-populated data that is not tied to a specific condition or state of the real system. Traditional deception techniques like these may be unconvincing to attackers of cyber-physical systems that control actual, physical processes.

SUMMARY

The present disclosure may enable cyber-physical systems to defend against cyber-attacks using high-fidelity deception techniques. As used herein, the term "cyber-physical system" refers to any network-connected system that supports a physical process occurring at least partially outside a computing environment. Said a different way, a cyber-physical system may perform any real-world process, as opposed to a computing process, using integrated components that sense and monitor the process, or manipulate and control the process, to achieve various goals for the real-world process, such as optimization, safety, efficiency and the like. Unlike "cyber-systems" or information technology (IT) systems that exchange data driven by computer processes (including virtual processes) occurring in a computer or computer network, the data exchanged within a cyber-physical system is driven by physical processes involving physical objects or physical environments that exist outside a computing environment (i.e., in the real-world).

Responding with pre-populated data that is not tied to a specific condition or state of the real system may work to distract a cyber-attacker in a virtual world, however this type of deception may be unconvincing to an attacker of a cyber-physical system that expects to see data changing based on physical processes happening in the real-world. A cyber-physical system may use the described deception techniques to deploy realistic decoys that generate data to mimic what the attacker expects to see if the data was generated by an actual participant, integrated with the cyber-physical system. The decoys execute according to one or more models (e.g., machine-learned models, physics-based models) trained or programmed based on historical, operational data generated by the cyber-physical system (or similar cyber-physical system) that the decoys are deployed to protect. The model mimics data generated by other components of the cyber-physical system, under various states and operating conditions of the cyber-physical system. As the state or operating conditions of the cyber-physical system change over time, the model causes the decoys to produce realistic data that is tailored to a current state or current operating condition of the cyber-physical system. Providing this synthetic output to the attacker may entice the attacker by appearing to expose a vulnerability in the cyber-physical system. The attacker might be deceived by the synthetic output from a decoy into thinking they are learning what part of the cyber-physical system senses, controls, or does (e.g., to validate an attack on a different part of the cyber-physical system). The one or more models configure the decoys to simulate behavior of the real cyber-physical system thereby providing highly-realistic deceptive responses to attackers.

A security administrator may receive an alert when an attacker is communicating with, and being distracted by, a decoy. While the attacker is distracted, the security administrator can take active security measures in response to the alert to defend against the attack.

In one embodiment, a method for protecting a cyber-physical system against a potential attacker, the method comprising: collecting historical information about the cyber-physical system; training, based on the historical information, a machine-learned model to predict future conditions of at least a portion of the cyber-physical system; detecting an input signal received by a decoy component of the cyber-physical system, wherein the decoy component is configured to simulate, based on the future conditions predicted by the machine-learned model, a functionality of the at least a portion of the cyber-physical system; responsive to detecting the input signal: outputting an alert to the cyber-physical system indicative of the potential attacker; and enabling the decoy component to respond to the input signal by simulating the functionality of the at least a portion of the cyber-physical system.

In a different embodiment, a system includes at least one processor; and a memory comprising instructions that, when executed, cause the at least one processor to: maintain a set of variables related to a physical process being emulated by a decoy of a cyber-physical system; dynamically update at least one variable from the set of variables based on future conditions of the cyber-physical system that are predicted by a machine-learned model that is trained from historical information collected about the cyber-physical system; and output network communications indicative of the at least one variable that was dynamically updated.

In yet another embodiment, a system for protecting a cyber-physical system against a potential attacker of the cyber-physical system, comprising at least one processor configured to: collect historical information about the cyber-physical system; train, based on the historical information, a machine-learned model to predict future conditions of at least a portion of the cyber-physical system; and responsive to detecting an input signal to the cyber-physical system: output an alert to the cyber-physical system indicative of a potential attacker; and respond to the input signal by simulating, based on the future conditions predicted by the machine-learned model, functionality and communications of the at least a portion of the cyber-physical system.

DETAILED DESCRIPTION

The following description and the referenced drawings provide illustrative examples of that which the inventors regard as their invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "cyber-physical system" means any network-connected system that supports a physical process occurring at least partially outside a computing environment. unless the context clearly dictates otherwise. The use of "cyber-system" and "information technology system" means "any network-connected system that supports computer processes occurring inside a computing environment" unless the context clearly dictates otherwise. The use of "e.g.," "etc.," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a decoy" includes two or more such decoys, and the like. The use of "optionally," "alternatively." and grammatically related terms means that the subsequently described element, event or circumstance may or may not be present/occur, and that the description includes instances where said element, event or circumstance occurs and instances where it does not. Words of approximation (e.g., "substantially," "generally"), as used in context of the specification and figures, are intended to take on their ordinary and customary meanings which denote approximation, unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Figure 1:
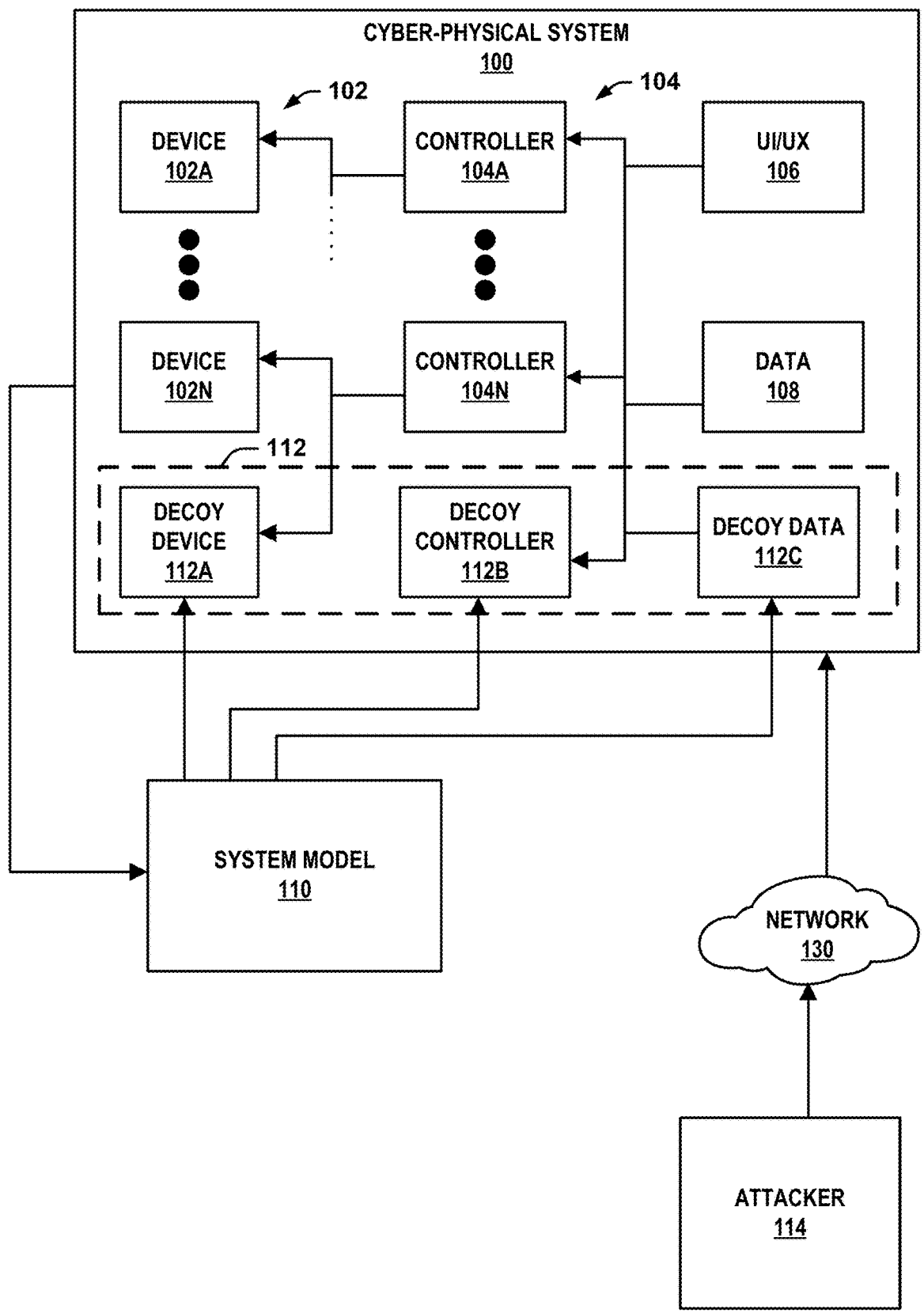
FIG. 1 is a conceptual diagram illustrating an example cyber-physical system including one or more decoys trained to distract an attacker, in accordance with the techniques of this disclosure.

FIG. 1 is conceptual diagram illustrating an example cyber-physical system including one or more decoys trained to distract an attacker, in accordance with the techniques of this disclosure. FIG. 1 includes cyber-physical system 100 communicatively coupled to system model 110 and network 130. From network 130, an attacker, such as attacker 114, may attempt to gain access to or control over cyber-physical system 100.

Network 130 represents a collection of computers and other devices communicatively coupled to share information. Network 130 may be coupled to, or form part of, the internet or some other public or private network. Network 130 can include any combination of one or more routers, switches, servers, mainframes, wired and wireless communication mediums, and other devices that facilitate exchange of information between two or more entities communicating across network 130. In the example of FIG. 1, cyber-physical system 100 is configured to communicate with devices connected to network 130. For example, cyber-physical system 100 may include an Ethernet interface for transmitting and receiving Ethernet traffic from other devices and systems that communicate via network 130.

Cyber-physical system 100 is a network-connected system that supports a physical process occurring in the real-world. Cyber-physical system 100 processes and generates data in response to physical processes occurring with physical objects or within physical environments that exist outside a computing environment, in the real-world. For instance, cyber-physical system 100 may be a heating, ventilation, and air-conditioning (HVAC) system that controls temperature, humidity, air flow, or other condition of a physical environment associated with a building or vehicle. Cyber-physical system 100 may be a lighting system that controls the luminosity of an office space, a home, or occupant area of a vehicle. Cyber-physical system 100 may be a power generation system that outputs electricity to a power-grid or a manufacturing or fabrication system that transforms a physical material into a physical product. Cyber-physical system 100 may be part of a propulsion system generating mechanical power that propels a manned or unmanned vehicle or machine.

Cyber-physical system 100 includes one or more devices 102A through 102N (collectively "devices 102"), one or more controllers 104A through 104N (collectively "controllers 104"), user interface (UI)/user experience (UX) component 106, and data 108. Unlike cyber-systems or IT systems that exchange data to facilitate purely virtual processes or computer processes occurring in a computing environment, the data handled by cyber-physical system 100 is driven by operations performed by devices 102, controllers 104, and UI/UX component 106, to support or control physical processes occurring outside a computing environment, in the real-world.

For example, cyber-physical system 100 may include a furnace or a boiler of a HVAC system. Device 102A may be a blower or a valve that controls heating capacity distribution through part of cyber-physical system 100. Controller 104A may communicate with and control device 102A whenever cyber-physical system 100 requires a change in heating capacity.

Controllers 104 may include one or more hardware processors or processing units. Controllers 104 may include non-transitory memories or other computer-readable storage medium configured to store instructions or other data that is accessed and executed by hardware processors or processing units. Controllers 104 may receive inputs and generate outputs in response. Controllers 104 may include various interfaces (e.g., network interfaces or "NICs") for communicating with and controlling one or more components of cyber-physical system 100. A user of cyber-physical system 100, e.g., a technician, may program controller 104A via UI/UX component 106. In some cases, controller 104A may be updated remotely, e.g., via a connection to a remote device communicatively coupled to cyber-physical system 100 via network 130.

In some examples, UI/UX component 106 includes one or more displays, speakers, microphones, user input components, and output components that together provide a user interface associated with cyber-physical system 100. From access to UI/UX component 106, a user may monitor and alter a state of devices 102, controllers 104, and data 108.

During operation, cyber-physical system 100 may generate data 108. Data 108 may be stored by cyber-physical system 100 in persistent storage or temporary storage. For example, a configuration file referenced by controller 104A when controlling devices 102 may be stored in persistent storage of cyber-physical system 100 so that the configuration file is not corrupted or lost when cyber-physical system 100 loses power. Other types of data 108, such as sensor data or state information, may be stored in temporary storage of cyber-physical system 100 if, for example, cyber-physical system 100 need not retain data 108 between power cycles.

By being accessible via network 130, cyber-physical system 100 may be vulnerable to cyber-attacks. In other words, devices 102, controllers 104, UI/UX component 106, and data 108 may be susceptible to malicious intrusions from devices or other systems on network 130. Responding with pre-populated protocol communications may work to distract a cyber-attacker in a virtual world, however this type of deception may be unconvincing to an attacker of cyber-physical system 100 which performs processes that cause change in the real or physical world.

For example, when attacking cyber-physical system 100, attacker 114 may establish a communication session with cyber-physical system 100 via network 130. Attacker 114 may snoop on data 108 or communications between components of cyber-physical system 100 and expect to see changes to data 108 based on physical processes happening in the real-world. If cyber-physical system 100 responds to suspected attackers with the same, pre-populated protocol communications or mock data anytime cyber-physical system 100 is under attack, attacker 114 may recognize the canned communications as an attempted deception and take overt actions to avoid the deception or attack a different part of cyber-physical system 100. In accordance with the techniques of this disclosure, cyber-physical system 100 may defend against cyber-attacks using high-fidelity deception techniques.

Cyber-physical system 100 includes one or more decoys 112 (e.g., decoy device 112A, decoy controller 112B, decoy data 112C) that simulate existing data sources and data sinks of cyber-physical system 100 so if an attacker 114 interfaces with decoys 112, decoys 112 communicate with the attacker 114 just like other components of cyber-physical system 100, and as the attacker expects. Decoy device 112A mimics the functionality of one or more devices 102. Decoy controller 112B simulates the operations of one or more controllers 104. Decoy data 112C stores a dynamic, replica of the information stored as data 108 to mimic the information otherwise stored as data 108.

Decoys 112 may generate portions of decoy data 112C for purposes of deceiving an attacker 114, without generating actual data 108 or otherwise interfering with any actual processes performed by other components of cyber-physical system 100. Other components of cyber-physical system 100 may use decoy data 112C to support an ongoing deception. Cyber-physical system 100 can also ignore or discard decoy data 112C as a way to free up computing resources or further prevent interference with any actual processes performed by other components of cyber-physical system 100.

Decoy data 112C may include "breadcrumbs" meant to entice an attacker 114. For instance, decoy data 112C may be a data structure (e.g., look-up table), application programming interface (API), or other form of data that is visible to attacker 114. Cyber-physical system 100 may configure decoy data 112C to alert a security administrator anytime the breadcrumbs (e.g., the data structure, API, or other form of data associated with decoy data 112C) are "picked up" or accessed.

Some components of cyber-physical system 100, such as devices 102 and controllers 104, are configured to communicate with decoys 112 to convey a more realistic deception to an attacker, such as attacker 114. Also referred to as "HoneyShill" components, a cyber-physical system 100 may implement a deception by configuring other components of the cyber-physical system 100 to regularly participate in interactions with decoys 112. Implementing direct communication between a decoy 112 and another component of the cyber-physical system 100 may make the decoy 112 appear genuine so an observing attacker 114 may be more likely to believe the deception.

Cyber-physical system 100 may configure actual components of cyber-physical system 100 (e.g., devices 102, controllers 104, UI/UX component 106, data 108) to act as HoneyShills. Cyber-physical system 100 may configure decoy components of cyber-physical system 100 (i.e., decoys 112) to act as HoneyShills. Cyber-physical system 100 may configure a combination of actual and decoy components to operate as HoneyShills.

For example, a security administrator may program controller 104N to request data (e.g., temperature, pressure, voltage) and send control signals or change of state information (e.g., valve state, motor throttle, dead band settings) to decoy device 112A. The security administrator may provide input to UI/UX component 106 to execute a script that automatically configures controller 104N to communicate with decoy device 112A similarly to how controller 104N may communicate with device 102N. The security administrator may interface with cyber-physical system 100 via network 130 to remotely configure controller 104N to communicate with decoy device 112A. In response to the control signals or change of state information received from controller 104N, decoy device 112A may output a portion of decoy data 112C to mimic what one or more of devices 102 would generate as data 108, if responding to similar control signals from controller 104N.

Similarly, decoy controller 112B may be configured to send control signals or change of state information to other decoys 112, including decoy device 112A. In response to the control signals or change of state information from decoy controller 112B, decoy device 112A may output decoy data 112C for deceiving an attacker 114. In this way, by communicating with other decoy or actual components of cyber-physical system 100, decoy controller 112B and decoy device 112A appear more genuine.

By having controllers or other parts of a cyber-physical system act as HoneyShills that participate in a deception, an attacker 114 may be more convinced the deception is real and therefore stay engaged with decoys 112 for a larger duration of time than if the controllers 104 or other parts of the cyber-physical system 100 did not participate in the deception. Keeping an attacker 114 engaged with a deceptive part of the cyber-physical system 100 may provide other defenses sufficient time to initialize and fend off the attacker 114.

In some examples, a security administrator may provide input to system model 110 or cyber-physical system 100 to perform configuration management for a deception. For example, a security administrator can engage with an interface of system model 110 or system 100 to configure decoys 112 to execute logic and gather information between the decoys 112 about interactions and alerts.

UI/UX component 106 may be configured to participate in a deception. For example, attacker 114 may interface with UI/UX component 106 to develop an understanding of cyber-physical system 100. UI/UX component 106 may be configured as a HoneyShill to lure attacker 114 towards decoys 112 and away from other components of cyber-physical system 100. For example, UI/UX component 106 may present an indication of decoy device 112A more prominently in a user interface (e.g., with a particular format, in a particular position, in a particular order) so an attacker 114 is more likely to choose to interrogate decoy device 112A rather than interfere with a different part of cyber-physical system 100.

UI/UX component 106 can in some examples alert a security administrator or other part of cyber-physical system 100 when UI/UX component 106 detects inputs at parts of UI/UX component 106 that are meant to lure an attacker 114. For example, in response to detecting a selection of the indication of decoy device 112A from the user interface of UI/UX component 106, UI/UX component 106 may send a message to the security administrator of cyber-physical system 100 that alerts the security administrator of a possible attack. It should be understood that a system administrator or a security administrator may be a human operator or a machine. For example, UI/UX component 106 may automate various administration tasks, including taking actions to thwart an attack in response to alerts.

In some cases, UI/UX component 106 may require a deeper level of interaction before generating an alert about a possible attacker. For example, to minimize false positives, and before UI/UX component 106 sends a message to the security administrator of cyber-physical system 100 to alert the security administrator of a possible attack, UI/UX component 106 may determine, from characteristics of the possible attack, whether the possible attack is genuine. For example, UI/UX component 106 may be programmed to execute rules or logic that determine, based on a current context of cyber-physical system 100 (e.g., the physical characteristics and cyber-characteristics of cyber-physical system 100) whether detected interactions at parts of UI/UX component 106 that are meant to lure an attacker are originating from an actual attacker 114. UI/UX component 106 may be programmed to execute rules or logic that determine, based on characteristics of the interaction with UI/UX component 106 (e.g., input type, input duration, input speed, input location) whether an interaction at parts of UI/UX component 106 that are meant to lure an attacker are originating from an actual attacker 114.

Cyber-physical system 100 relies on system model 110 to generate decoys 112 with sufficient realism to deceive a sophisticated attacker, such as attacker 114. For example, system model 110 may execute on one or more processors of cyber-physical system 100 (e.g., as a function of controllers 104, devices 102, or one or more remote processors accessible to cyber-physical system 100. In some examples, cyber-physical system 100 includes system model 110. In other cases, cyber-physical system 100 is separate from system model 110.

System model 110 can be, generally, any type of machine-learned or physics-based model, trained or programmed on historical data associated with cyber-physical system 100, to produce an interrogatory response that mimics how an actual component of cyber-physical system 100 would respond to an interrogation from an attacker, given a particular context. Machine-learned examples of system model 110 include neural networks, deep-learning neural networks, Bayesian networks, and any other type of machine-learned model. As a machine-learned model, system model 110 is configured to generate, from training data (e.g., historical input and output data), logic derived from patterns or rules identified in the training data, that predicts one or more future outputs, for a particular set of inputs, without having ever been explicitly programmed to predict the future outputs for the particular set of inputs. As a physics-based model, system model 110 is programmed based on historical data to execute logic that mimic realistic output, for a given set of inputs.

System model 110 may undergo training. System model 110 may receive as training data, example inputs to cyber-physical system 100, and example outputs and other information generated by cyber-physical system 100, over time. The training data input to system model 110 may include physical-state information or cyber-state information associated with cyber-physical system 100, for various contexts. The training data may include examples of data 108 at different times and during different operating conditions of cyber-physical system 100. The training data may include example "network traffic" or information exchanged between devices 102, controllers 104, and UI/UX component 106, during different contexts and for various operating conditions.

System model 110 may generate decoys 112 to follow rules or logic that produce an expected output given a particular set of inputs. System model 110 may learn a specific type of data 108 that is generated by device 102N, in response to a particular control signal received from controller 104A, given a particular time or given a particular state of other components of cyber-physical system 100. System model 110 may configure decoys 112 to execute specific logic for creating decoy data 112C to mimic an expected output from the other components of cyber-physical system 100, for the given context.

By relying on system model 110, decoys 112 are trained on historical, operational data generated by cyber-physical system 100 (or a similar cyber-physical system that decoys 112 are deployed to protect). System model 110 learns how to cause decoys 112 to mimic data generation performed by other components of cyber-physical system 100, under a variety of states and operating conditions. System model 110 causes decoys 112 to produce realistic data that is tailored to a current state or current operating condition of cyber-physical system 100. By providing seemingly-realistic, synthetic data in response to an attacker, such as attacker 114, decoys 112 appear to expose vulnerabilities in cyber-physical system 100 without actually conveying any real insights into the workings of cyber-physical system 100.

System model 110 may cause decoys 112 to output decoy data 112C that appears similar to data 108 that devices 102 and controllers 104 might output if actually undergoing a cyber-attack. An attacker 114, therefore, might be deceived from data generated by decoys 112 into thinking they are learning what part of cyber-physical system 100 senses, controls, or does, particularly if a different part of cyber-physical system 100 is under cyber-attack. For example, system model 110 may cause decoy device 112A to mimic what device 102N might do if controller 104N was under cyber-attack. System model 110 may configure decoys 112 to simulate behavior of cyber-physical system 100 thereby providing highly-realistic deceptive responses to attackers.

In some examples, a security administrator, via UI/UX component 106, may receive an alert when an attacker 114 is communicating with, and being distracted by, one of decoys 112. While the attacker 114 is deceived, the security administrator can take active security measures in response to the alert to defend against the attack.

For example, being that decoy device 112A is not a real device that senses, monitors, modifies, or controls part of a process performed by cyber-physical system 100, a system administrator may configure UI/UX component 106 to signal when any entity within cyber-physical system 100 attempts to interact with (e.g., write data to or read data from) decoy device 112A. In other words, because decoy device 112A may not be relied on by any other components of cyber-physical system 100 to further operations of cyber-physical system 100, an attempt to communicate with device 112A may be a signal of an attack. While an attacker tries to interact with device 112A, a system administrator may be alerted and can take action to identify the attacker 114 or isolate the rest of cyber-physical system 100, from the cyber-attack.

In this way, the described techniques may enable a cyber-physical system, such as cyber-physical system 100, to successfully deceive an attacker 114 just long enough for a security administrator of the cyber-physical system 100, or other counter-measure, to take action. In addition, by configuring decoys 112 to generate alerts immediately upon receipt of unexpected communications (e.g., from an attacker 114), there is less uncertainty about whether an attack is actually occurring. The alert generated by the decoys 112 is triggered by a strong signal from an attacker 114. As such, the decoys 112 may provide a better detection process that results in zero or nearly zero false positive detections.

Figure 2:
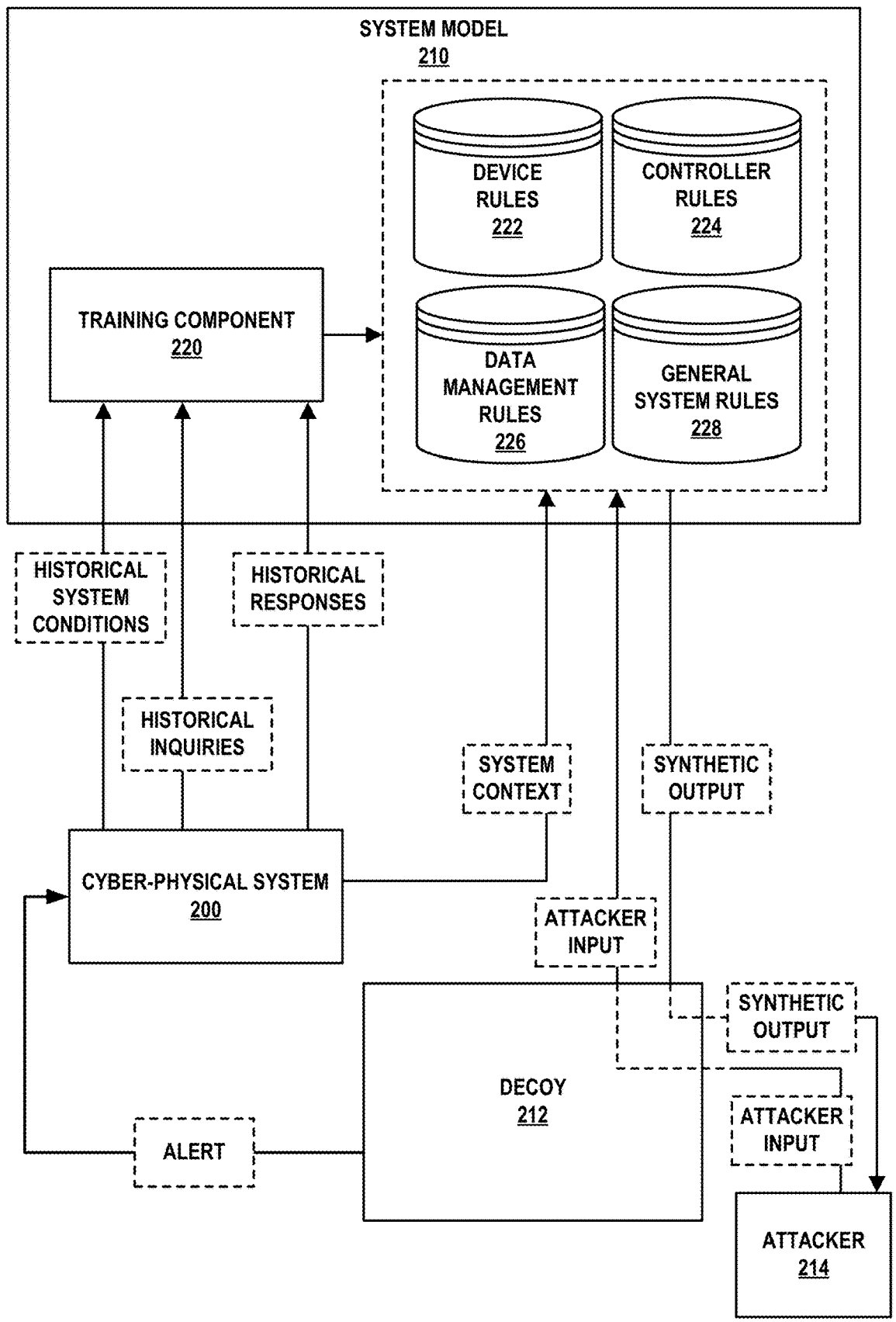
FIG. 2 is a conceptual diagram illustrating an example model trained, based on historical data associated with a cyber-physical system, to deploy one or more decoys for distracting an attacker, in accordance with the techniques of this disclosure.

FIG. 2 is a conceptual diagram illustrating an example model trained, based on historical data associated with a cyber-physical system, to deploy one or more decoys for distracting an attacker, in accordance with the techniques of this disclosure. FIG. 2 includes cyber-physical system 200, system model 210, decoy 212, and attacker 214. System model 210 includes training component 220, device rules 222, controller rules 224, data management rules 226, and general system rules 228. FIG. 2 is described in the context of FIG. 1. For example, cyber-physical system 200 is an example of cyber-physical system 100, system model 210 is a more detailed example of system model 110, decoy 212 is an example of one of decoys 112, and attacker 214 is an example of attacker 114, of FIG. 1.

System model 210 includes one or more machine-learned models (made up of device rules 222, controller rules 224, and data management rules 226) trained to generate "synthetic responses" to an attacker's inquiries into cyber-physical system 200. The synthetic responses mimic historical responses generated by cyber-physical system 200 in response to actual historical inquiries received by cyber-physical system 200. System model 210 tailors the synthetic responses for a current system context to ensure the synthetic responses mimic actual responses generated by cyber-physical system 200 given a similar, historical context.

A synthetic response may appear genuine, however, because the synthetic response is derived from one or more rules 222, 224, 226, or 228 of system model 210, and not generated by an actual working component of cyber-physical system 200, the synthetic response does not provide any actual insight into the workings or operating conditions of cyber-physical system 200. As such, the synthetic responses generated by system model 210 enable decoys, such as decoy 212, to provide a realistic deception without giving away any useful working knowledge of cyber-physical system 200.

System model 210 includes training component 220 for generating rules and other logic that system model 210 uses to generate synthetic responses in response to a cyber-attack. To replicate the behavior of cyber-physical system 200, system model 210 may rely on one or more recurrent neural networks (RNNs). The RNN may analyze historical information associated with cyber-physical system 200 to frame a forecasting problem to be solved by the RNN. For example, given a set of historical temperature readings and subsequent controller decisions made in response to the temperature readings, system model 210 may execute an RNN to forecast future temperature readings and controller decisions.

RNNs are a subset of neural network models. Neural network models are recognized for using a biologically inspired programming paradigm that enables a computer to learn from observational data. A typical neural network model consists of a collection of nodes, which loosely model neurons in a human brain. Such systems "learn" to perform tasks by considering examples, generally without being programmed with any task-specific rules.

RNNs draw conclusions about information based on the temporal structure of the input data. The network considers not only current inputs but also the state of the RNN that arose from considering previous inputs in a sequence of inputs. That is to say, an RNN has memory including multiple layers where each layer corresponds to a particular element in an input sequence. Each layer receives the RNN's long-running memory of the input sequence so far, as well as the output generated by the RNN from analyzing previous elements in the sequence.

In some cases, decoy generation and cyber-physical system simulation may benefit from using long-short-term memory (LSTM) type RNNs. LSTM type RNNs determine an output for a particular input, given past outputs derived from previous inputs, as well as based on other broad contextual features derived from training data. An LSTM type RNN may generate a decoy that relies on information about past outputs derived from previous inputs (i.e., long-term memory) as well as information provided the most-recent outputs derived from the most-recent inputs to the LSTM (i.e., short-term memory).

Device rules 222, controller rules 224, data management rules 226, and general system rules 228 can include rules and other logic learned by training component 220 from analyzing historical information associated with cyber-physical system 200. The historical information can include historical inquiries received by cyber-physical system 200. For example, historical inquiries may include example inputs received from an operator or other controller communicating directly, or remotely, with components of cyber-physical system 200. Historical inquiries may include machine understandable messages (e.g., system calls, network traffic) originating from or received by devices and controllers that make up cyber-physical system 200.

Device rules 222, controller rules 224, data management rules 226, and general system rules 228 can include rules and other logic generated manually by an administrator of a cyber-physical system 200. For example, when creating a "new" decoy as part of cyber-physical system 200, the new decoy can represent a component of cyber-physical system 200 that does not currently exist, and new logic can be programmed into the decoy on how to react to data output from system model 210. For example, cyber-physical system 200 may be a boiler system. The new decoy may simulate a new pressure relief valve that does not actually exist in the boiler system in the physical world. The decoy can be manually programmed with logic that calculates a pressure from values observed overtime from the real boiler system. The decoy may execute the logic to control variables in the system model 210 to cause effect on other decoys in the system model 210. For instance, if a pressure variable is too high, the decoy valve may open to simulate a reduction in a temperature variable detected by a downstream decoy sensor.

Training component 220 may observe historical responses to the historical inquiries to generate rules and other logic that predict how components of cyber-physical system 200 are likely to respond to future inputs. For example, training component 220 may identify patterns between content associated with some historical inquiries and corresponding responses. Training component 220 may generate a rule or other logic so that system model 210 generates a synthetic response to an inquiry that mimics previous responses made by cyber-physical system 200, to similar inquiries.

In addition to training system model 210 based on historical inquiries and historical responses associated with cyber-physical system 200, training component 220 may improve the rules and other logic of system model 210 using other information. Training component 220 may enable system model 210 to generate synthetic responses that are dynamically tailored according to current operating conditions of cyber-physical system 200. By adapting the synthetic responses to a current context, system model 210 can generate synthetic responses that are convincing to an attacker and are therefore likely to give a system administrator time to defend against an attack. For example, system model 210 may generate physics-based rules at general system rules 228 that define changes to a physical-working environment where part of cyber-physical system 200 resides depending on other conditions of cyber-physical system 200. System model 210 may generate other physics-based rules at general system rules 228 that define changes to attributes, characteristics, variables, or state information about conditions of physical processes performed by cyber-physical system 200. For instance, system model 210 may generate a rule for updating a temperature at part of cyber-physical system 200 given changes to outside temperature, changes in pressure at a valve of a different part of cyber-physical system 200 or using some other physics-based criteria. System model 210 may learn from historical system conditions some of the dependencies of cyber-physical system 200 and generate general system rules 228 that define the dependencies.

For instance, device 102A may be a boiler of cyber-physical system 200. When device 102A switches on and generates heating capacity, a different part of cyber-physical system 200 (e.g., device 102N) that receives the heating capacity from the boiler may typically increase in temperature, at a particular rate. To implement a convincing deception, system model 210 may configure decoy 212 to indicate a temperature that increases at the particular rate, when configured as a recipient of the heating capacity from device 102A. This way, if an attacker 214 observes that the boiler is producing heating capacity, decoy 212 will behave in a way that deceives attacker 214 into thinking decoy 212 is an actual, integrated part of cyber-physical system 200.

System model 210 may generate rules and other logic that decoy 212 executes to deceive an attacker 214. Decoy 212 may be any type of decoy, including a device or sensor decoy that primarily monitors cyber-physical system 200. As a monitoring device, decoy 212 is configured to provide false assurance or validation of an ongoing attack on part of cyber-physical system 200. Decoy 212 may execute device rules 222 to deceive an attacker 214.

For example, decoy 212 may mimic a typical response from a sensor of cyber-physical system 200 when a controller of cyber-physical system 200 receives a particular command or particular inquiry. An attacker, such as attacker 214, may rely on synthetic outputs generated by decoy 212 to verify an attack on cyber-physical system 200 is working. The attacker 214 may monitor decoy 212 down-stream from the controller, to verify the controller under attack is commanding the desired condition or change.

By distracting attacker 214 with synthetic outputs, a security administrator may have time to take active measures to defend against attacker 214. For example, decoy 212 may automatically trigger an alert recognized by cyber-physical system 200, any time decoy 212 receives an inquiry from an external entity. In other words, because decoy 212 is not actually integrated into cyber-physical system 200, cyber-physical system 200 does not rely on decoy 212 to perform any function beyond deception. Other components of cyber-physical system 200 therefore have no reason to communicate with decoy 212 other than to provide up-to-date status information or configuration information. As such, decoy 212 may be configured to output an alert or cause an interrupt at cyber-physical system 200 to indicate to a security administrator that decoy 212 has received input, potentially from an attacker 214.

Decoy 212 may be a controller decoy that generates output to mimic how a controller communicates with (and in some cases controls) other components or devices of cyber-physical system 200. Decoy 212 may follow controller rules 224. Unlike a monitoring decoy, a controller decoy may require more elaborate logic to mimic the different types of responses that a real controller can generate, particularly given a wide-variety of operating conditions. For example, a controller typically communicates with multiple devices, whereas a single device may only communicate with a single controller. Therefore, controller rules 224 may be dependent on a greater quantity of inputs than device rules 222, as controller rules 224 may need to account for more conditions or characteristics of cyber-physical system 200.

Decoy 212 may be configured as part a decoy data store. As decoy data, decoy 212 stores information in a memory or other type of computer-readable media associated with cyber-physical system 200 that is meant to be accessed by an attacker, such as attacker 114. Decoy 212 may store replica data associated with cyber-physical system 200, but not actual data. Decoy 212 may execute data management rules 226 to modify or adjust the replica data, to mimic how real data associated with cyber-physical system 200 changes over time given different system contexts or historical system conditions. The information retained by decoy 212 may entice the attacker 214 that accesses decoy 212 so a security administrator can be alerted to the presence of the attacker 214, and defend against the attack. Decoy 212 may mimic a data structure, buffer, messaging system, or other data store associated with cyber-physical system 200.

Although the techniques of this disclosure are mostly described in the context of implementing "integrated deception" to handle a cyber-attack, there are other types of model-driven deception that can benefit from the described techniques. The techniques of this disclosure are equally applicable to other types of model-driven deception, including clone deception and copy deception. One deception might be preferred over another, as a function of the location of the deception in relation to the real, cyber-physical system and the type of threat intended to be countered Integrated deception places decoys within the real cyber-physical system and the decoy model operates such that the decoy logically relates to real data within the real system. For example, in a chemical process, a decoy could be generated that controls a fictional valve downstream that controls a fictional flow to a decoy sensor.

Clone deception is when an exact replica of a cyber-physical system or portion thereof (i.e., a deceptive clone) is presented instead of the real cyber-physical system to deceive an attacker that they are interacting with components of the real cyber-physical system. To implement deceptive cloning, the cyber-physical system may require logic that determines when a connection is likely associated with an attacker and not, so as to send the connection to the deceptive clone or to the real cyber-physical system. Clone deception may be most suitable when implemented to protect part of a cyber-physical system that is associated with access control mechanisms like virtual private network (VPN) connections or proxies where anomalous or bad authentication can be forwarded to the deceptive clone instead of the real system. Deceptive cloning traps the attacker into a fictional world that is directly related to the real system, but instead of the real system, the fictional world is driven by a model built from observed data of the real system. Only upon control or other altering interactions by the attacker is the projection of effect necessary.

In the example of FIG. 2, training component 220 may generate rules that configure decoy 212 to operate as a deceptive clone of cyber-physical system 200 that mimics historical observations of cyber-physical system 200. If attacker 214 unsuccessfully tries to access cyber-physical system 200, cyber-physical system 200 may route the connection through decoy 212 and allow attacker 214 to interact with a model trained to mimic cyber-physical system 200, without actually allowing the attacker 214 access any component of cyber-physical system 200.

Copy deception is similar to clone deception. In copy deception however, multiple replicas of the real cyber-physical system are presented as potential targets. Copy deception obfuscates the real cyber-physical system by each executing an independent model of the real system model. The deceptive copies may execute unique models with clear differences, to further obfuscate which potential target is the real cyber-physical system. Each deceptive copy can respond and react to interactions independently. Copy deception could be utilized in coordination with moving target defense techniques like internet protocol (IP) address hopping to further confuse an attacker.

Training component 220 may generate rules that configure decoy 212 to operate as multiple deceptive clones of cyber-physical system 200, such that each mimic historical observations of cyber-physical system 200. When attempting to access cyber-physical system 200, decoy 212 may present interfaces into multiple, different cyber-physical systems, requiring attacker 214 to guess at which interface is the real interface into cyber-physical system 200. Decoy 212 may allow attacker 214 to interact with a model of a deceptive copy that is trained to mimic cyber-physical system 200, without actually allowing attacker 214 access to any component of cyber-physical system 200.

Figure 3:
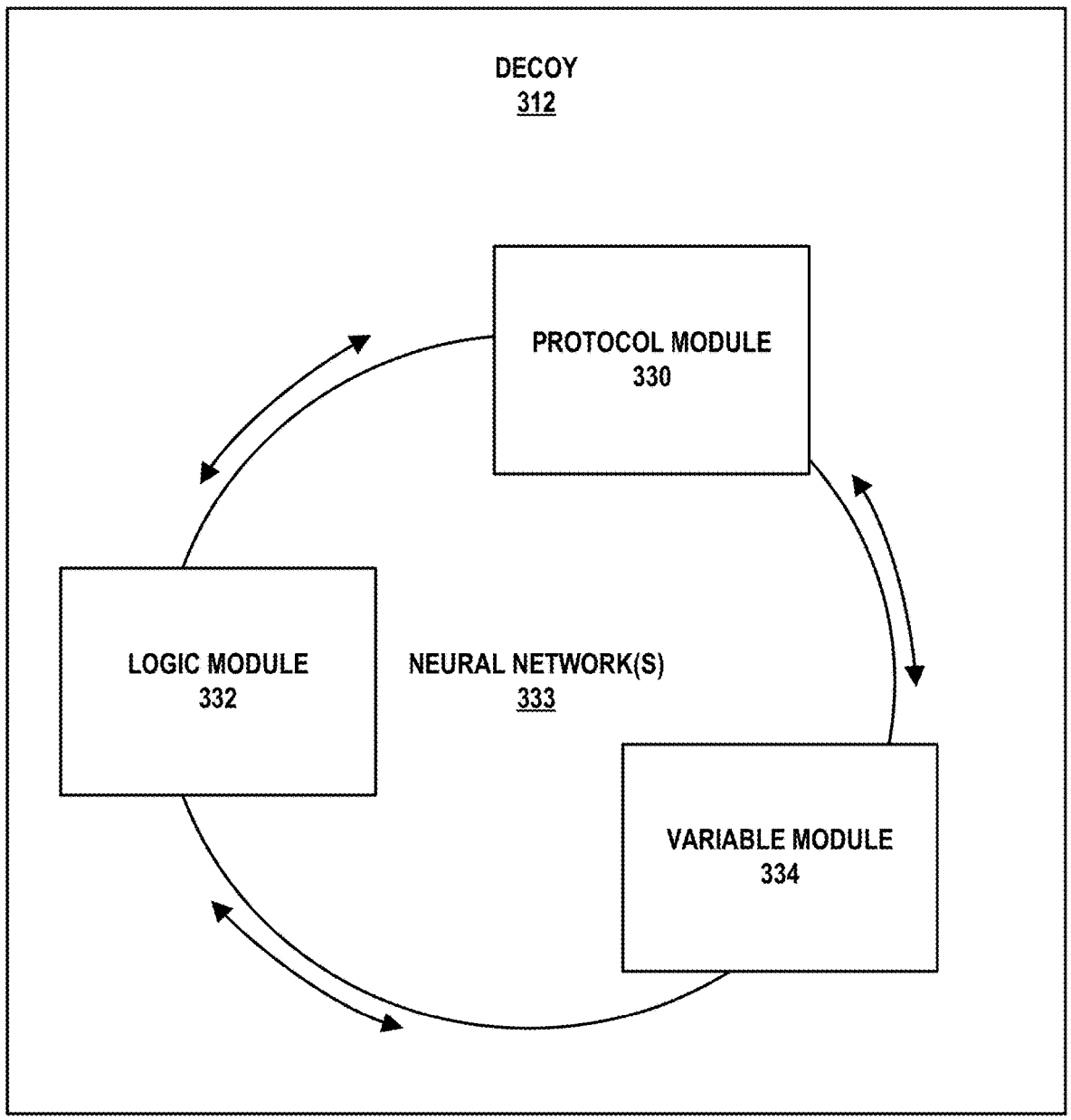
FIG. 3 is a conceptual diagram illustrating an example decoy for deceiving an attacker of a cyber-physical system, in accordance with the techniques of this disclosure.

FIG. 3 is a conceptual diagram illustrating an example decoy for distracting an attacker of a cyber-physical system, in accordance with the techniques of this disclosure. FIG. 3 illustrates decoy 312. Decoy 312 is an example of any one of decoys 112 and 212 from FIGS. 1 and 2.

To provide sufficient fidelity, system model 110 and system model 210 may generate decoy 312 by adhering to certain requirements. System models 110, 210 may generate decoy 312 to reflect the physical properties or physics behind a real cyber-physical system. For instance, by learning the physics behind changes to different parts of cyber-physical system 200, system model 210 may create decoy 312 which produces realistic variable data that mimics similar variable data produced by an actual component of cyber-physical system 200. System models 110, 210 may generate decoy 312 dynamically and the underlying physics models that system models 110, 210 executes automatically adjust to support additional components. Instead of sandboxing decoy 312 to operate independently, system models 110, 210 may cause decoy 312 to appear integrated into the real cyber-physical system by communicating with other decoys or with other components of the real cyber-physical system. By generating decoys in this way, decoy 312 may execute logic that closely resembles an actual, tempting and easy-to-exploit target of the cyber-physical system.

Decoy 312 includes three main attributes that interact with neural networks 333, including a protocol attribute, a logical attribute, and a variable attribute that all interact to support operations of one or more underlying neural networks 333. Each of these attributes defines the characteristics and behavior that neural network 333 follows, when imitating part of the cyber-physical system. To deceive potential attackers, decoy 312 may perform some functions that make decoy 312 appear as if it were a real device operating in a real cyber-physical environment. For example, devices in a real cyber-physical system, such as devices 102 of cyber-physical system 100, communicate according to one or more network protocols with controllers 104 and other parts of cyber-physical system 100. In addition, the devices 102 typically control or monitor a set of variables, and the devices 102 typically perform actions based on a set of logic. To be effective, system models 110, 210 cause decoy 312 to do the same. By dividing decoy 312 into a protocol attribute, a logical attribute, and a variable attribute, system models 110, 210 can simplify the decoy generation process. A security administrator may in some examples, define the attributes of decoy 312 and provide input to system models 110, 210 to cause decoy 312 to be deployed.

The decoy 312 illustrated in FIG. 3 includes three main components that interact with neural networks 333, including: protocol module 330, variable module 334, and logic module 332. Modules 330 through 334 may be components of decoy 312 that communicate or otherwise share information to enable decoy 312 to execute a realistic deception. For example, modules 330, 332, and 334, as well as neural networks 333 may interact via direct messaging communications, or by sharing information through a database (e.g., by reading and writing data to and from specific locations in the database).

Protocol module 330 represents a portion of decoy 312 that simulates communication between decoy 312 and other decoys and components of a real cyber-physical system. Some components of cyber-physical systems communicate according to multiple different communication protocols, for instance, depending on the domain of the communication. For example, controller 104A of cyber-physical system 100 may communicate according to a first messaging scheme or protocol to communicate a first set of control signals to device 102A and may communicate according to a different messaging scheme or protocol to communicate a second set of control signals to device 102N.

Protocol module 330 may be trained to generate and respond to communications. Protocol module 330 may be trained to adapt the frequency and structure of communications to generate network traffic that is purposeful. For instance, decoy 312 may be deployed to protect a building automation system. Protocol module 330 may cause decoy 312 to generate network communications (e.g., decoy data 112C or other decoy communications) that is not random or incoherent. Protocol module 330 may create and output network communications or so-called decoy communications that appear to facilitate an actual process. Protocol module 330 may select an appropriate communication protocol depending on a type of decoy communication or variable associated with the decoy communication.

Variable module 334 maintains a set of variables related to the physical process being emulated by decoy 312. Variable module 334 may maintain records of information that decoy 312 simulates as being monitored or controlled. Examples of variables maintained by variable module 334 may include temperature, voltage, current, wattage, flow rate, capacity, humidity, or any other attribute of a cyber-physical system that decoy 312 simulates to control. Variable module 334 may maintain variables that are associated with the logic and protocols associated with modules 330 and 332. For example, variable module 334 might be a temperature variable associated with cyber-physical system 100 when decoy 312 is emulating a valve for controlling fluid flow and variable module 334 may instead maintain a voltage or current variable, as opposed to the temperature variable, when decoy 312 is emulating a switch for controlling electricity flow.

Decoy 312 may produce input and/or output. Variable module 334 may generate variables or extrapolate variables received from other parts of a cyber-physical system. Variable module 334 of decoy 312 may exchange variables, via protocol module 330, with other decoys. A variable that is an output of one decoy device can be read by another device using the network protocol associated with those devices. This interaction generates traffic on the network and adds to the realism of the deception. For example, decoy 312 may monitor air temperature and another decoy could query that temperature periodically to control air flow.

Logic module 332 directs the operation of decoy 312. Logic module 332 is configured to implement functions for supporting communications generated by protocol module 330 based on information managed by variable module 334. For example, programmed as a decoy HVAC controller, logic module 332 may simulate control of a fan in an HVAC system by determining when to generate control signals that a real controller would output to regulate airflow. Logic module 332 may monitor a variable maintained by variable module 334 that is associated with a real or simulated temperature sensor, and may cause protocol module 330 to simulate controlling the fan, depending on whether the variable reaches a particular temperature threshold.

Figure 4:
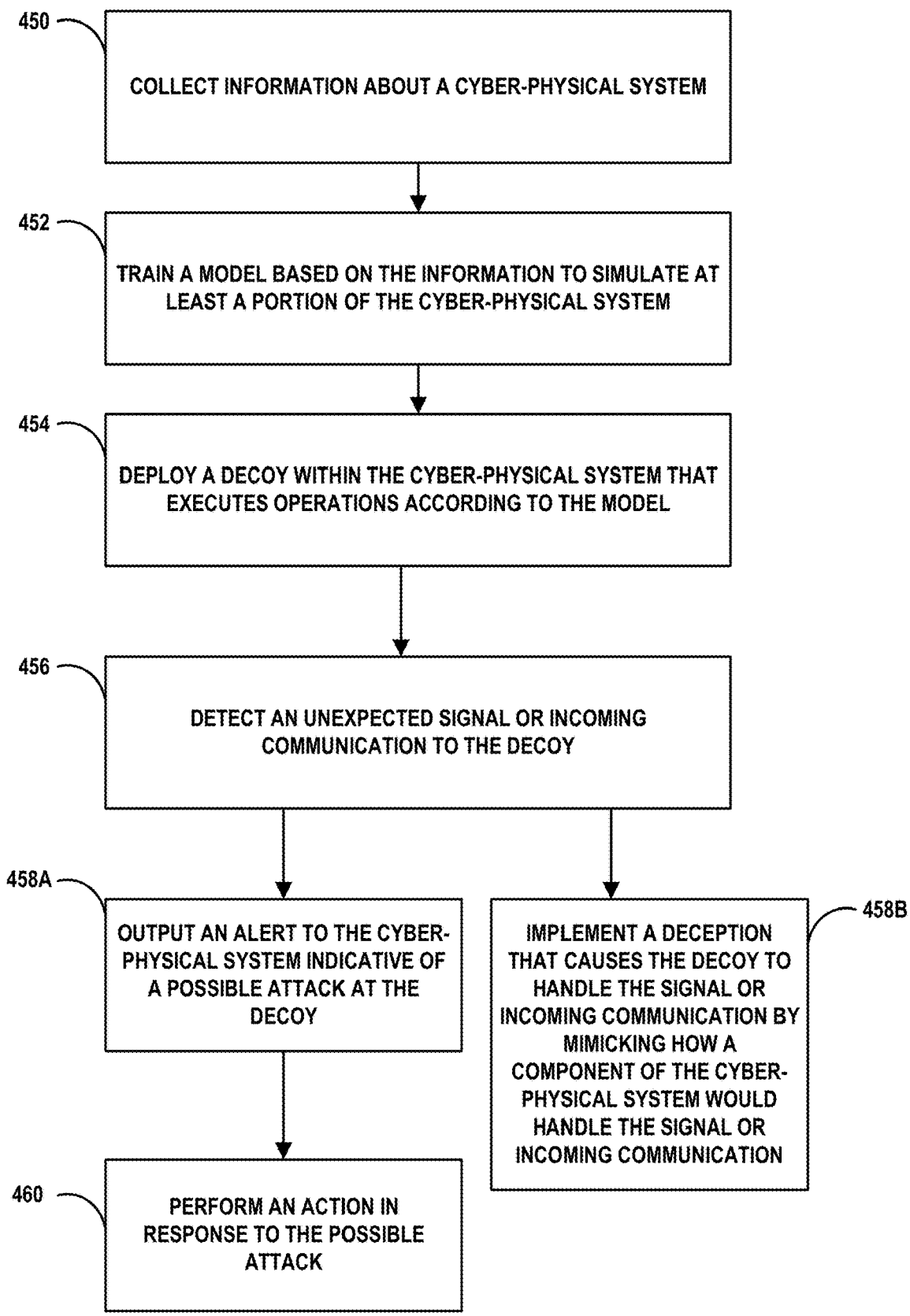
FIG. 4 is a flow-chart illustrating example operations performed in response to a cyber-attack by a cyber-physical system and an integrated decoy, in accordance with the techniques of this disclosure.

FIG. 4 is a flow-chart illustrating example operations performed in response to a cyber-attack by a cyber-physical system and an integrated decoy, in accordance with the techniques of this disclosure. Operations 450 through 460 of FIG. 4 may be performed in a different order than what is shown in FIG. 4 and may be performed with additional or fewer steps than what is shown in FIG. 4. FIG. 4 is described in the context of system model 210 of FIG. 2. For example, one or more processors of a computer that are communicatively coupled to, or integrated into, cyber-physical system 200. The one or more processors execute operations attributed to system model 210 and decoy 212 by executing instructions for performing operations 450 through 460.

In operation, system model 210 may collect information about a cyber-physical system (450). For example, training component 220 of system model 210 may collect sensor readings, control signals, network traffic, and any other information that training component 220 can infer from monitoring cyber-physical system 200, over time.

System model 210 may train a model based on the information to simulate at least a portion of the cyber-physical system (452). For example, training component 220 may generate one or more rules 222 through 228 to predict future sensor readings, future control signals, future network traffic, and other future information related to cyber-physical system 200 for a variety of conditions. As a simple example, training component 220 may generate a device rule of rules 222 that predicts a particular temperature value or reading if one or more conditions associated with cyber-physical system 200 (e.g., time of day or other sensor reading) is satisfied. In this way, system model 210 may generate decoys 212 that follow rules 222 through 228 to mimic how actual components of cyber-physical system 200 may perform if interrogated by an attacker.

System model 210 may deploy a decoy within the cyber-physical system that executes operations according to system model 210 (454). For example, system model 210 may generate decoy 212 as a dragnet for catching future attackers of cyber-physical system 200. Decoy 212 may execute according to rules 222 through 228 generated by system model 210. To an untrained or uneducated observer of cyber-physical system 200, decoy 212 may appear to perform operations that are similar to operations performed by a device or controller of cyber-physical system 200. For example, attacker 214 may send a signal or message to decoy 212 to verify attacker 214 has access to cyber-physical system 200.

In some examples, system model 210 may deploy decoy 212 dynamically. For example, decoy 212 may be dynamically deployed to intercept a suspect input signal in response to detecting the suspect input signal at cyber-physical system 200. That is, cyber-physical system 200 may detect are input signal to a controller or device and rather than output an error to the sender of the input signal, system model 210 may automatically generate decoy 212 to handle the input signal and keep the sender distracted while cyber-physical system 200 can perform other defense measures.

System model 210 may detect an unexpected signal or incoming communication to the decoy (456). For example, decoy 212 may be configured to communicate with one or more other decoys or other HoneyShills of cyber-physical system 200, however the existence of decoy 212 may not be apparent except through malicious intrusions to cyber-physical system 200. In other words, only a security administrator or other user of cyber-physical system with sufficiently high privileges may be aware of where system model 210 has deployed decoy 212. Other components of cyber-physical system 200, for instance while acting as a Honey-Shill, may be aware of decoy 212 if the security administrator or other user programs the other components to be aware of decoy 212. In this way, if system model 210 registers an attempted communication with decoy 212, system model 210 or decoy 212 itself, may trigger an alarm as the attempted communication is likely an attack. For example, a controller of cyber-physical system 200 may detect an attempted communication with decoy 212 and determine that decoy 212 is registered as a decoy with cyber-physical system 200.

In response to detecting the unexpected signal (456), system model 210 and/or the decoy, may output an alert to the cyber-physical system that is indicative of a possible attack at the decoy (458A). For example, system model 210 and/or decoy 212 may trip an interrupt or send a communication to a UI/UX component or modify a network log, to record the unexpected signal.

Further in response to detecting the unexpected signal (456), system model 210 and/or the decoy, may implement a deception that causes the decoy to handle the signal or incoming communication by mimicking how a component of the cyber-physical system would handle the signal or incoming communication (458B). For example, decoy 212, after triggering an alarm, may attempt to keep a potential attacker distracted by exchanging information with the attacker, in ways that a device or controller of cyber-physical system 200 would, if communicating with the attacker. Logic executing as part of decoy 212 may generate dynamic responses to attacker inquiries, and may include information in the responses that changes, as expected, according to the modeled physics of cyber-physical system 200.

Cyber-physical system 200 may perform an action in response to the possible attack (460). For example, cyber-physical system 200 may attempt to identify an attacker, or enable various active, defensive measures to prevent the attacker from gaining access to or causing damage to cyber-physical system 200. As one example, cyber-physical system 200 may record an IP address of attacker 214 and add the IP address to a blacklist of authorized remote users.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
generating a plurality of examples for a training data set, where generating the examples in the training data set comprises receiving example historical information about a cyber-physical system; and
training a system model using the training data set to generate a decoy, the decoy configured to generate an expected output given a particular set of inputs,
where the inputs to the decoy comprise a current system context of the cyber-physical system and an inquiry into the decoy by a potential attacker, and
where the expected output of the decoy comprises a generated synthetic output that mimics historical outputs generated by the cyber-physical system for a given historical system context, where the generated synthetic output is based on one or more system rules, the system rules generated when training the system model and based on historical changes to attributes, characteristics, variables, or state information about conditions of physical processes performed by the cyber-physical system.

2. The method of claim 1, wherein receiving example historical information about the cyber-physical system comprises at least one of:
receiving example historical system contexts of the cyber-physical system;
receiving example historical inputs to the cyber-physical system; or
receiving example historical outputs generated by the cyber-physical system.

3. The method of claim 1, wherein receiving example historical information about the cyber-physical system comprises:
receiving example historical system contexts of the cyber-physical system, the historical system contexts comprising at least one of:
a historical system condition of the cyber-physical system;
a historical state of the cyber-physical system;
a historical operating condition of the cyber-physical system; or
a historical characteristic of the cyber-physical system.

4. The method of claim 1, wherein receiving example historical information about the cyber-physical system comprises:
receiving example historical inputs to the cyber-physical system, the historical inputs comprising at least one of:
a historical input from an operator of the cyber-physical system communicating with components of the cyber-physical system;
a historical input from a controller of the cyber-physical system communicating with components of the cyber-physical system; or
a historical input from a device of the cyber-physical system communicating with components of the cyber-physical system.

5. The method of claim 1, wherein receiving example historical information about the cyber-physical system comprises:
receiving example historical outputs generated by the cyber-physical system, the historical outputs comprising at least one of:
operational data generated by components of the cyber-physical system; or
sensor data generated by a sensor of the cyber-physical system.

6. The method of claim 1, wherein the generated synthetic output comprises a predicted future condition of at least a portion of the cyber-physical system.

7. The method of claim 1, wherein the generated synthetic output simulates a functionality of at least a portion of the cyber-physical system.

8. The method of claim 1, wherein training the system model using the training data set to generate the decoy further comprises:
configuring the decoy to execute logic for creating decoy data to mimic an expected output from another component of the cyber-physical system for a given system context.

9. The method of claim 1, further comprising:
training the system model using the training data set to detect an input signal indicative of an attempt by the potential attacker to gain access to or gain control over the cyber-physical system.

10. The method of claim 9, further comprising:
training the system model using the training data set to, responsive to detecting an input signal indicative of an attempt by the potential attacker to gain access to or gain control over the cyber-physical system, perform operations of:
output an alert to the cyber-physical system indicative of a possible attack.

11. The method of claim 10, further comprising:
training the system model using the training data set to, responsive to detecting an input signal indicative of an attempt by the potential attacker to gain access to or gain control over the cyber-physical system, perform operations of:
respond to the input signal by simulating a functionality of at least a portion of the cyber-physical system to distract the potential attacker.

12. The method of claim 10, further comprising:
training the system model to, responsive to detecting an input signal indicative of an attempt by the potential attacker to gain access to or gain control over the cyber-physical system, perform operations of:
respond to the input signal by simulating a functionality of at least a portion of the cyber-physical system to distract the potential attacker.

13. A method comprising:
receiving a system context of a cyber-physical system;
applying a system model to the system context, where the system model is trained to generate an interrogatory response to a received inquiry that mimics historical outputs generated by the cyber-physical system for a given system context;
receiving an inquiry into the system model by a potential attacker;
obtaining from the system model a synthetic output that mimics how a component of the cyber-physical system would respond to the inquiry given the system context, where the synthetic output is based on one or more system rules, the system rules generated when training the system model and based on historical changes to attributes, characteristics, variables, or state information about conditions of physical processes performed by the cyber-physical system; and
providing the synthetic output to the potential attacker.

14. The method of claim 13, wherein the synthetic output:
comprises a predicted future condition of at least a portion of the cyber-physical system; or
simulates a functionality of the at least a portion of the cyber-physical system.

15. The method of claim 13, wherein the system context comprises at least one of a system condition, a state, an operating condition, or a characteristic of the cyber-physical system.

16. The method of claim 13, wherein applying the system model further comprises:
generating a decoy, the decoy configured to execute logic for creating decoy data to mimic an expected output from another component of the cyber-physical system for a given system context.

17. The method of claim 13, wherein the synthetic output comprises at least one of:
a future sensor reading;
a future control signal; or
future network traffic.

18. The method of claim 13, wherein the synthetic output is configured to mimic a historical output generated by the cyber-physical system in response to an historical inquiry received by the cyber-physical system.

19. The method of claim 13, wherein the synthetic output is configured to mimic how a component of the cyber-physical system would respond to interrogation from the potential attacker, given a particular system context.

20. The method of claim 13, further comprising:
training the system model to detect an input signal indicative of an attempt by the potential attacker to gain access to or gain control over the cyber-physical system.

21. The method of claim 20, further comprising:
training the system model to, responsive to detecting an input signal indicative of an attempt by the potential attacker to gain access to or gain control over the cyber-physical system, perform operations of:
output an alert to the cyber-physical system indicative of a possible attack.

* * * * *